United States Patent [19]
Caris et al.

[11] Patent Number: 5,481,447
[45] Date of Patent: Jan. 2, 1996

[54] SWITCHED CAPACITANCE VOLTAGE MULTIPLIER WITH COMMUTATION

[75] Inventors: Hubertus A. Caris, Enschede; Paulus J. M. Dost, Almelo, both of Netherlands

[73] Assignee: Fluke Corporation, Everett, Wash.

[21] Appl. No.: 431,331

[22] Filed: Apr. 27, 1995

[51] Int. Cl.$^6$ .................................................. H02M 7/42
[52] U.S. Cl. ................................................. 363/60; 327/536
[58] Field of Search .......................... 363/59, 60; 320/1; 307/110; 327/530, 536, 537

[56] References Cited

U.S. PATENT DOCUMENTS

| | | | |
|---|---|---|---|
| 4,504,445 | 3/1985 | Walz | 422/186.1 |
| 4,623,824 | 11/1986 | Scolari et al. | 315/241 R |
| 4,994,953 | 2/1991 | Haak | 363/71 |
| 5,023,768 | 6/1991 | Collier | 363/68 |
| 5,095,223 | 3/1992 | Thomas | 307/110 |
| 5,132,895 | 7/1992 | Kase | 363/60 |
| 5,414,614 | 5/1995 | Fette et al. | 363/59 |

FOREIGN PATENT DOCUMENTS

| | | | |
|---|---|---|---|
| 0951602 | 8/1982 | U.S.S.R. | 363/60 |
| 2094076 | 9/1992 | United Kingdom | 363/60 |

*Primary Examiner*—Peter S. Wong
*Assistant Examiner*—Adolf Berhane

[57] ABSTRACT

A voltage multiplier is constructed using a series combination of capacitors and an associated switching circuit which provides for charging each capacitor in the series by sequentially connecting each capacitor to a d.c. input voltage. The d.c. input voltage of N volts is converted to an a.c. output voltage of peak-to-peak $2*(N+1)$ times the input voltage where N is the number of capacitors in the series. A pattern of sequential switching is chosen to generate a sequentially rising and falling voltage to form a half waveform. A commutator couples the half waveform to a pair of output terminals in an alternating polarity to form the completed a.c. output voltage.

5 Claims, 2 Drawing Sheets

COMMUTATOR

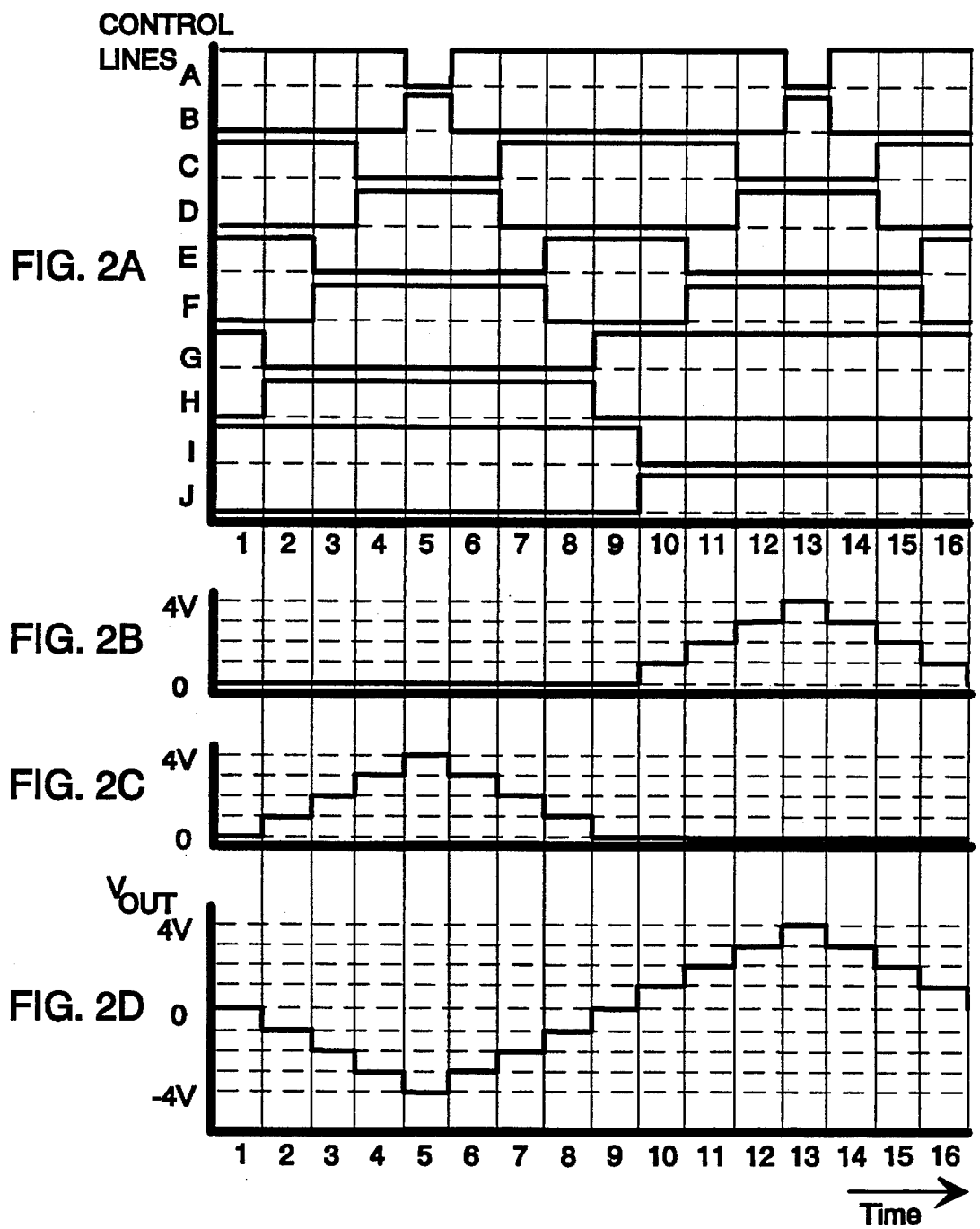

SWITCHED CAPACITANCE VOLTAGE MULTIPLIER WITH COMMUTATION

BACKGROUND OF THE INVENTION

This invention relates generally to power supplies and in particular to a voltage multiplier using a series combination of capacitors sequentially charged through an associated switching circuit.

Generating high voltages from lower voltage power sources is a common design problem in electronics applications. Many applications involve the use of display technology, such as cathode ray tubes, electroluminecscent (EL) displays, and cold cathode displays, that require voltage potentials in the hundreds or thousands of volts but at low current. A typical EL display is designed to operate with an a.c. (alternating current) voltage with a frequency of 400 hertz and 100 V rms potential but with less than 10 milliamperes of current draw for a predetermined level of brightness. EL display brightness can be adjusted by varying either the frequency or the voltage. Generating such a high voltage from the typical d.c. low voltages available for powering semiconductor components has traditionally been the function of an inverter-type power supply ("inverter"). Inverters are designed to convert a d.c. (direct current) voltage level to a different voltage level, usually a higher voltage, using active switching to convert the d.c. voltage to a pulsed voltage which in turn is applied to the primary winding of a transformer. Energy is stored in a magnetic field generated by the primary winding and a voltage is induced in the secondary winding. The secondary voltage induced depends on the turns ratio of the primary to secondary windings and the mutual coupling of the windings in a manner well known in the art. Inverters, typically simple circuits with high conversion efficiency, are available as self contained components with the input and output parameters specified so that the designer may select the particular device that best suits the application.

Inverters suffer from a disadvantage in that "noise" in the form of high frequency energy is created by the voltage conversion process. Noise from the transformer is in the form of magnetic flux which induces sway voltages in adjacent circuits. To mitigate this effect, inverter transformers are typically sheathed in ferromagnetic material to contain the magnetic flux. Furthermore, noise may also be coupled directly back into the low voltage power supply by the nature of the chopping or inverting action. When the d.c. voltage is switched, current spikes are created that require the addition of input filter circuits to filter it. If sensitive circuits are employed nearby, more elaborate filtering and isolating schemes are required to adequately isolate the noise of the inverter. Finally, the voltage and frequency of inverters are not easily varied, making the task of adjusting EL display brightness more difficult.

Passive voltage multipliers using capacitors to store energy have been employed in lieu of inverters of a true polarity reversing a.c. voltage can be obtained. Voltage multipliers have been constructed of series combinations of diodes and capacitors in a manner well known in the art. An alternating polarity sine wave signal allows the diodes, which conduct in only one polarity, to be utilized as switches for alternatively charging capacitors and then dumping the accumulated charge to other capacitors disposed in series. In this manner, a series combination of N capacitors may be charged to yield a total potential across the series combination of N times the charging voltage. The advantage of voltage multiplier circuit is that the energy storage during the voltage conversion process is performed with capacitors which store energy as accumulated charge rather than in a magnetic field. A voltage multiplier circuit, while providing a simple method of multiplying voltage, requires an alternating polarity input voltage to operate, a limitation that makes this topology impractical in applications where only a unipolar power supply is available, such as in battery-operated portable equipment, because of the difficulty of generating an alternating polarity voltage. Furthermore, this technique yields a high voltage that is d.c., rather than the a.c. potential required for EL displays, thus requiring additional switching circuitry.

In U.S. Patent application Ser. No. 08/311,470, filed Sep. 23, 1994, entitled "Voltage Multiplier Using Switched Capacitance Technique, and assigned to Fluke Corporation, a voltage multiplier is provided using a series combination of capacitors and an associated switching circuit which charges each capacitor in the series by momentarily connecting each capacitor to a d.c. input voltage in a sequential fashion. The d.c. input voltage of N volts is converted to an a.c. output voltage with a peak-to-peak value of $V \cdot (N+1)$ where V is the input d.c. voltage and N is the number of capacitors in the series combination. To develop an output signal of 240 volts peak-peak from an input voltage of 30 volts d.c., seven capacitors would thereby be required in the series combination, along with associated charging and switching circuitry. It would be desirable to provide a voltage multiplier using a switched capacitance technique to maintain simplicity and relative noise advantages over other techniques but employing fewer components, thereby reducing manufacturing cost and circuit board space.

SUMMARY OF THE INVENTION

In accordance with the present invention, a voltage multiplier circuit is provided that converts a d.c. input voltage into an a.c. output voltage which is a multiple of the input voltage. A series network consists of a number of sections disposed in series. Each section consists of a capacitor and an associated set of switches for charging the capacitor by coupling it across the input voltage at a selected time. Each set of switches is controlled by a parallel set of control signals generated by an external control circuit. A half waveform consisting of a sequentially increasing voltage followed by a sequentially decreasing voltage is generated across the series network according to the operation of the set of switches. A commutator coupled between a pair of output terminals and an end of the series network operates to present the half waveform to the output terminals in alternating polarities to obtain the a.c. output voltage.

The set of switches that alternatively couples the pair of output terminals to the series combination of capacitors in one polarity and the other is collectively referred to as the commutator. The particular capacitor in the series being charged at any given moment, along with selected polarity of the commutator, determines the output voltage present across the output terminals. The peak-peak a.c. output voltage generated is $$2 \cdot (N+1) \cdot V$$

where V is the d.c. input voltage and N is the number of capacitors in the series combination. In the present invention, a desired output voltage of 240 volts peak-peak may thus be generated from an input voltage of 30 volts d.c. using only three capacitors in the series combination.

The switched capacitor voltage multiplier is readily scaleable to include more capacitors to obtain higher voltage multiplication factors or as few as one capacitor to obtain a voltage quadrupler. The practical limit is the reverse breakdown voltage of the diodes and switches, along with the practical high voltage circuit design considerations such as corona protection. The effective capacitance of the series combination of capacitors decreases as more capacitors are added, rapidly diminishing its ability to maintain a charge voltage over a period of time while providing current to a load.

The frequency of the output signal can readily be varied, with the lower frequency limit governed by the amount of charge storage in the capacitors and the upper frequency limit governed by practical switching losses in the charging circuit. The frequency range of the output signal is 500 hertz to 1,500 hertz in the preferred embodiment.

The low noise characteristics of the switched capacitance voltage multiplier technique are maintained. The switching frequency is greater than the frequency of the output signal because the voltage of all N capacitors are alternatively switched in and out of the circuit twice during one period of the output waveform. This higher switching frequency makes filtering requirements easier because smaller filter components can be used. Because there is no transformer, there is no concern about magnetic flux inducing stray voltages in nearby circuits. The shape of the output waveform can be fit to a sine wave or a triangle by varying the timing parameters of the control signals which govern the charging sequence.

One object of the present invention is to provide a voltage multiplier circuit that generates an a.c. signal from a d.c. input voltage using a series combination of capacitors and a commutator.

Another object of the present invention is to provide a voltage multiplier circuit which operates on d.c. voltage and generates a high voltage a.c. signal in a highly efficient manner to be compatible with the needs of battery-operated portable equipment.

An additional object of the present invention is to provide a voltage multiplier circuit constructed with a series network of capacitors and associated switching components that is readily scaleable to provide an a.c. signal with an amplitude that is a desired multiple of an input d.c. voltage.

A further object of the present invention is to provide a voltage multiplier circuit that provides a high voltage a.c. signal with a frequency that is readily adjustable without affecting the a.c. signal amplitude.

Other features, attainments, and advantages will become apparent to those skilled in the art upon a reading of the following description when taken in conjunction with the accompanying drawings.

BRIEF DESCRIPTION OF THE DRAWINGS

FIG. 2A–D together comprise a timing diagram illustrating the timing signals and the resultant output signal of the circuit of FIG. 1.

DETAILED DESCRIPTION OF THE INVENTION

Figure 1:
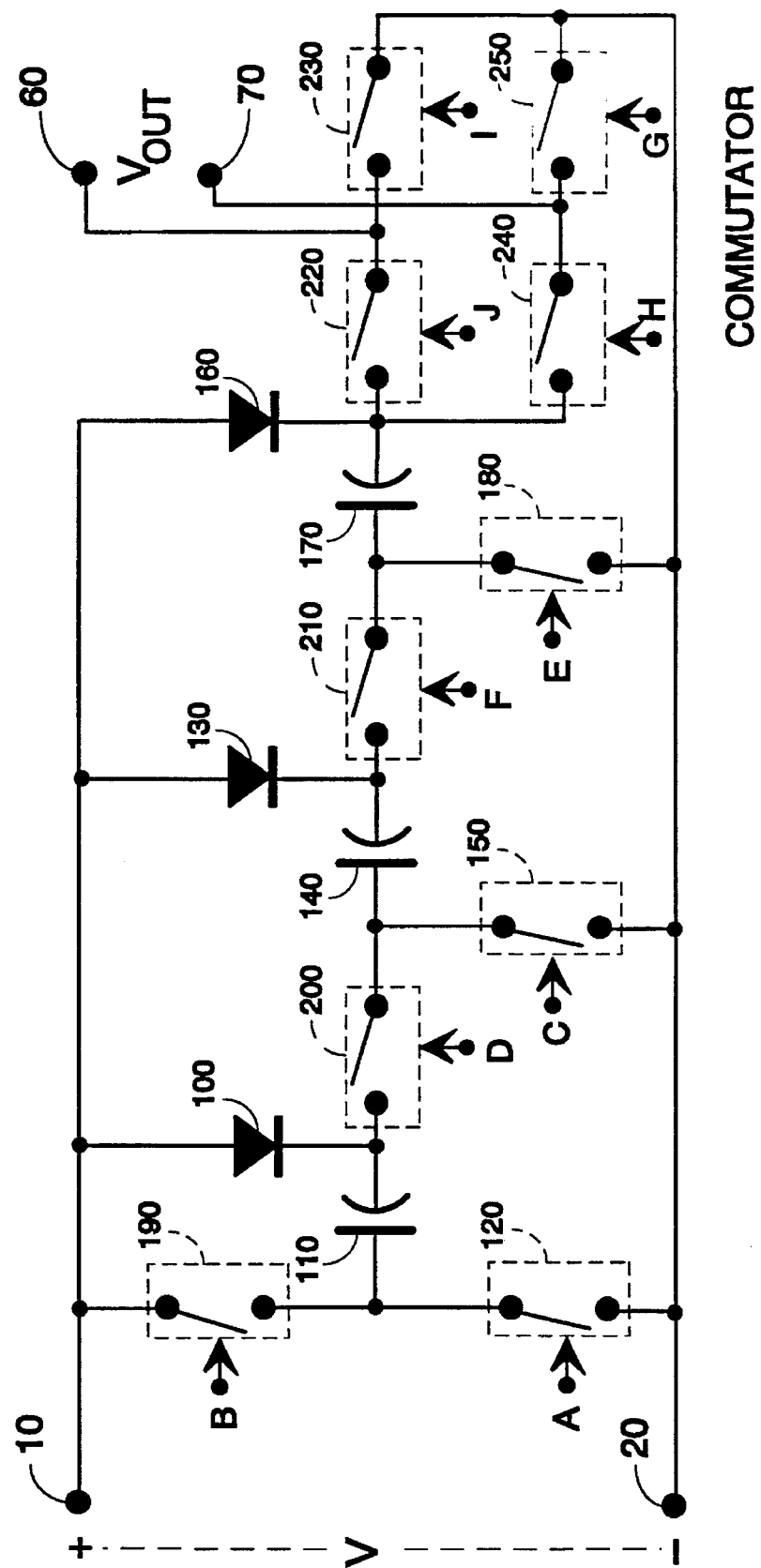
FIG. 1 is a circuit schematic diagram of a preferred embodiment of the present invention.

Referring now to FIG. 1, there is shown a schematic circuit diagram according to the present invention. A d.c. (direct current) input voltage V is coupled across a pair of input terminals 10 and 20. The polarity of the voltage V is shown with+(positive) polarity coupled to positive terminal 10 and- (negative) polarity coupled to negative terminal 20.

A series combination of a diode 100, a capacitor 110, and a switch 120 form a first section coupled across the terminals 10 and 20, with an anode of the diode 100 coupled to the terminal 10 and a cathode of the diode 100 coupled to the capacitor 110. A series combination of a diode 130, a capacitor 140, and a switch 150 form a second section coupled across the terminals 10 and 20, with an anode of the diode 130 coupled to the terminal 10 and a cathode of the diode 130 coupled to the capacitor 140. A series combination of a diode 160, a capacitor 170, and a switch 180 form a third section coupled across the terminals 10 and 20, with an anode of the diode 160 coupled to the terminal 10 and a cathode of the diode 160 coupled to the capacitor 170. A switch 190 is disposed in series with the capacitor 110, a switch 200, the capacitor 140, switch 210, and the capacitor 170 to form a series network from the first, second, and third sections. A commutator, comprised of switches 220, 230, 240, and 250, is coupled in series between an end of the series network and the terminal 20 which functions to couple a negative output terminal 60 and positive output terminal 70 across the end of the series network in alternating polarities in synchronization with the charging cycles across each of the first, second, and third sections to obtain an a.c. output voltage labeled Vout. Each of the capacitors 110, 140, and 170 have capacitance values large enough to maintain substantially all of their charge voltage throughout the relevant time periods within the period of the output waveform.

The first, second, and third sections, coupled together by the switches 190, 200, and 210, collectively comprise the series network. It will be noted that the series network may be comprised of as few as one section in which the first section and the switch 190 would comprise the series network which would then be coupled to the commutator. The preferred embodiment of the present invent employs three sections to obtain the desired multiplication ratio.

The switches 220 and 230 alternatively couple the positive output terminal 60 between the end of the series network and the negative terminal 20. Similarly, the switches 240 and 250 alternatively couple the negative output terminal 70 between the end of the series network and the negative input terminal 20. By coupling the terminals 60 and 70 to the end of the series network and the terminal 20 in a coordinated fashion, the switches 220, 230, 240, and 250 function collectively as a commutator.

Each of the switches 120, 150, 180, 190, 200, 210, 220 230, 240, and 250 have a respective control input such that the switch opens and closes responsive to control signal received at the control input. For purposes of illustration, each switch will be assumed to close on logical "high" level and open on a logical "low". A set of control signals A–J are respectively coupled to the control inputs of the switches 120, 150, 180, 190, 200, 210, 220 230, 240, and 250 as shown in FIG. 1. The set of control signals may be generated by a microprocessor, digital controller, or customized digital circuit designed to carry out the function according to the preferred embodiment of the present invention.

FIG. 2A–D together comprise a timing diagram that illustrates the operation of the circuit shown in FIG. 1 according to the preferred embodiment of the present invention. The horizontal axis shows an identical time scale over one period of the output signal. The vertical axis for the upper graph of FIG. 2A shows the voltage level of the control signals A–J and the vertical axis for the lower graphs of FIG. 2B–D shows the voltage levels present at the output terminals 60 and 70 and the output voltage Vout developed across the terminals 60 and 70. A single period of the a.c.

output waveform is illustrated and the waveform is repetitively produced to produce the a.c. output voltage Vout in FIG. 2D.

Looking now at the upper graph labeled CONTROL LINES, in FIG. 2A the parallel system of control signals A–J is shown. The control signals are digital in that a predetermined logical high voltage level and logical low voltage are provided for each control signal. The upper graph should be interpreted in the manner of a conventional timing diagram which focuses on the relationship of timing events, defined as transitions of logical states, between the parallel signals. In the following explanation, it is assumed that the capacitors 110, 140, and 170 have reached their fully charged voltage level V which is the steady-state operating condition of the circuit. The switches 120, 150, 180, 190, 200, 210, 220 230, 240, and 250 actuate responsive to control signal levels with logical high being closed and logical low being open. In the preferred embodiment of the present invention, the period of the a.c. output waveform Vout shown in FIG. 2D is divided in sixteen subperiods of essentially equal duration. The resulting shape of the a.c. output waveform resembles a triangle wave. The subperiods may be manipulated in order to force the resulting a.c. output waveform Vout to more closely conform to a sine wave in order to minimize harmonic content of Vout.

It will be noted that during any transition between subperiods, the control signals A–J are timed to ensure a "break-before-make" condition so that no short circuits occur during the transition. For example, in the transition from time 4 to time 5, switch 120 coupled to control signal A opens, while switch 190, coupled to control signal B, closes. Unless care is taken to ensure the break-before-make condition, the terminals 10 and 20 may be momentarily shorted together, an undesirable occurrence. The break-before-make condition is implemented by delaying or offsetting in time the transition of the respective control signals to ensure that one switch opens before another switch in a related circuit node closes. In the preferred embodiment, a delay of one eighth of a subperiod was chosen to implement the break-before-make time period. At all such critical transitions during a period of the output waveform Vout, a break-before-make condition shall be assumed although the imposed time delays are not shown the timing diagram.

At time 1, responsive to the control signals A–J, switches 120, 150, and 180 are closed, allowing charge current to flow through the diodes 100, 130, and 160 to charge each of the capacitors 110, 140, and 170 respectively to the voltage V. Switches 230 and 250 of the commutator are closed, shorting terminals 60 and 70 and resulting in Vout=0 as shown in FIG. 2D.

At time 2, responsive to the control signals A–J, switches 120 and 150, and 180 are closed, allowing charge current to continue to flow as in time 1. Switches 230 and 240 of the commutator are closed, coupling terminal 60 to input terminal 20 and terminal 70 to the end of the capacitance ladder which is at the voltage potential of 1*V where V is the d.c. input voltage. Because the terminal 70 is defined as the negative output terminal, the resulting voltage Vout appears as −1*V volts as shown in FIG. 2D.

In a similar fashion over the time periods 3–8, the triangular waveform is developed by the coordinated opening and closing of the switches 120, 150, 180, 190, 200, and 210 while the commutator polarity remains constant.

At time 9, responsive to the control signals A–J, switches 120, 150, and 180 are closed, allowing charge current to flow through the diodes 100, 130, and 160 to charge each of the capacitors 110, 140, and 170 respectively to the voltage V. Switches 230 and 250 of the commutator are closed, shorting terminals 60 and 70 and resulting in Vout=0 as shown in FIG. 2D.

At time 10, switches 220 and 250 are closed, coupling the positive output terminal 60 to the end of the capacitance ladder and the negative output terminal 70 to the negative input terminal 20. The commutator polarity is now the reverse of the polarity in times 2–8. In a similar fashion over the remaining time periods 11–16, the triangular waveform is developed by the coordinated opening and closing of the switches 120, 150, 180, 190, 200, and 210 while the commutator polarity remains constant to develop the positive half of the output waveform Vout.

It will be obvious to those having ordinary skill in the art that many changes may be made in the derails of the above described preferred embodiments of the invention without departing from the spirit of the invention in its broader aspects. For example, the present invention is readily extendible to include more capacitors and associated switching and charging components in series to increase the desired output to input voltage ratio. The present invention can accommodate as few as one capacitor to function as a voltage quadrupler when used in conjunction with the commutator. The relative lengths and the sequence of the subperiods may be varied to create other waveshapes such as sine waves, with the constraint that at least one charging period for each capacitor in the series must be included for each period of the output waveform. The switches may be implemented by other types of switches, such as field effect transistors or electromechanical switches, depending on the requirements for switching speed, power handling capability, and voltage isolation. Therefore, the scope of the present invention should be determined by the following claims.

What we claim as our invention is:

1. A d.c. to a.c. voltage multiplier circuit comprising:
   (a) a series network comprising a plurality of capacitors, each of said capacitors having a sufficient mount of capacitance to substantially maintain a charge voltage over a period of an a.c. output waveform;
   (b) a plurality of switches for selectably coupling said each of said capacitors to a d.c. input voltage for a selected charging time at least once during said period wherein said series network produces a sequentially increasing voltage followed by a sequentially decreasing voltage during one half of said period to form a waveform half;
   (c) a pair of output terminals; and
   (d) a commutator circuit interposed between said pair of output terminals and said series network, said commutator circuit selectively coupling said output terminals to receive said waveform half in a positive polarity followed by a negative polarity to form said a.c. output waveform at said pair of output terminals.

2. A d.c. to a.c. voltage multiplier circuit of claim 1 wherein said a.c. output waveform has a peak-peak voltage that is 2·(N+1) times said d.c. input voltage and N is the number of capacitors in said series network.

3. A d.c. to a.c. voltage multiplier circuit of claim 1 wherein the period of said a.c. output waveform is readily adjustable.

4. A d.c. to a.c. voltage multiplier circuit of claim 1 wherein said a.c. output waveform resembles a triangle wave.

5. A d.c. to a.c. voltage multiplier circuit of claim 1 wherein said a.c. output waveform resembles a sine wave.

* * * * *